US006347137B1

(12) United States Patent
Mason

(10) Patent No.: US 6,347,137 B1
(45) Date of Patent: *Feb. 12, 2002

(54) METHODS AND APPARATUS FOR REQUESTING ASSISTANCE AT A SELF-CHECKOUT TERMINAL

(75) Inventor: Timothy E. Mason, Buford, GA (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,961

(22) Filed: Dec. 4, 1998

(51) Int. Cl.[7] .................................................. H04M 7/60

(52) U.S. Cl. .................... 379/167.03; 186/61; 235/383; 902/38

(58) Field of Search ................................ 379/167, 168, 379/170, 169, 156, 93.01; 902/22–23, 24, 25, 36, 37, 38, 39, 40, 41; 340/815.4, 384.73; 186/61

(56) References Cited

U.S. PATENT DOCUMENTS 5,115,888 A * 5/1992 Schneider .................... 186/61
5,177,345 A * 1/1993 Baitz .......................... 235/462
5,426,282 A * 6/1995 Humble ...................... 235/383
5,482,139 A * 1/1996 Rivalto ........................ 186/36
5,489,773 A * 2/1996 Kumar ....................... 235/462
5,494,136 A * 2/1996 Humble ........................ 186/61
5,500,890 A * 3/1996 Rogge et al. ................. 379/91
5,579,000 A * 11/1996 Mulqueen ................ 340/825.3
5,644,630 A * 7/1997 Durco, Jr. .................... 379/159
5,663,963 A * 9/1997 Goodwin, III ............... 371/5.1
5,721,536 A * 2/1998 Mulqueen ................ 340/825.3
RE35,758 E * 3/1998 Winter et al. ................. 379/88
5,752,582 A * 5/1998 Hayward ...................... 186/61
5,754,106 A * 5/1998 Goodwin, III .............. 340/540
5,769,269 A * 6/1998 Peters ........................... 221/7
5,784,446 A * 7/1998 Stuart ......................... 379/167
5,878,064 A * 3/1999 Goodwin, III ............. 371/68.2
5,923,735 A * 7/1999 Swartz et al. ............ 379/93.12
5,992,570 A * 11/1999 Walter et al. ................. 186/36
5,993,047 A * 11/1999 Novogrod et al. ..... 364/479.01
5,997,170 A * 12/1999 Brodbeck ............. 364/479.06
6,000,522 A * 12/1999 Johnson ...................... 194/217
6,009,538 A * 12/1999 Goodwin, III et al. ....... 714/25
6,056,194 A * 5/2000 Kolls ......................... 235/381

* cited by examiner

*Primary Examiner*—Curtis Kuntz
*Assistant Examiner*—Barry W Taylor
(74) *Attorney, Agent, or Firm*—Priest & Goldstein, PLLC

(57) ABSTRACT

The present invention provides a self-checkout terminal having input and output devices for performing a self-checkout process. The input and output devices are controlled and monitored by system software that determines, based on its monitoring of the input and output devices, whether intervention by store personnel is necessary. The system software further controls a voice modem that provides a digital audio signal output to a store intercom system, and has access to digital audio files containing announcements to be played on the store intercom system. When the system software determines that intervention by store personnel is necessary, it selects an appropriate digital audio file and plays the digital audio file over the store intercom system by means of the voice modem.

13 Claims, 2 Drawing Sheets

METHODS AND APPARATUS FOR REQUESTING ASSISTANCE AT A SELF-CHECKOUT TERMINAL

BACKGROUND OF THE INVENTION

1. Field of the Invention

The present invention relates generally to improvements in retail checkout terminals, and more particularly to advantageous aspects of an apparatus and method for requesting assistance at a self-checkout terminal.

2. Description of the Prior Art

It is becoming increasingly common for purchasers of consumer goods to pay for the goods without the need for a human cashier. For example, motorists frequently purchase gasoline at self-service stations by inserting a credit card directly into a card reader on the pumping station. This approach has a number of advantages. First, this arrangement saves on the number of persons required to maintain and run a business establishment. Second, it decreases the incidence of employee mistake or dishonesty. Third, it decreases the amount of time required to complete a typical transaction.

However, self-checkout terminals in a retail environment sometimes require attention from a store associate for a variety of reasons, including the following:

a customer has tried to purchase an item that is restricted by age (e.g., alcohol or cigarettes in the United States);

a self-checkout terminal's security system has detected an event that requires store intervention or auditing of the transaction;

the customer requests additional assistance;

the customer's credit or debit card transaction was not approved by the authorization service;

the system is low on cash and may be unable to make change;

the system is low on, or out of, paper;

a device is reporting a failure (e.g., a paper jam, a coin jam, or a scanner failure);

the customer has attempted to purchase an item that is not in the product database; or the system is no longer communicating to its data server.

There is thus a need for a self-checkout system that provides a way to notify store associates that their assistance is required at the self-checkout terminal.

SUMMARY OF THE INVENTION

The present invention provides a self-checkout terminal having input and output devices for performing a self-checkout process. The input and output devices are controlled and monitored by system software that determines, based on its monitoring of the input and output devices, whether intervention by store personnel is necessary. The system software further controls a voice modem that provides a digital audio signal output to a store intercom system, and has access to digital audio files containing announcements to be played on the store intercom system. When the system software determines that intervention by store personnel is necessary, it selects an appropriate digital audio file and plays it over the store intercom system by means of the voice modem.

Additional features and advantages of the present invention will become apparent by reference to the following detailed description and accompanying drawings.

DETAILED DESCRIPTION

The present invention provides a self-checkout system in which a voice modem is connected to a self-checkout terminal to send data over a telephone line to a store's intercom system for the purpose of notifying store associates when assistance is required at the self-checkout terminal.

Figure 1:
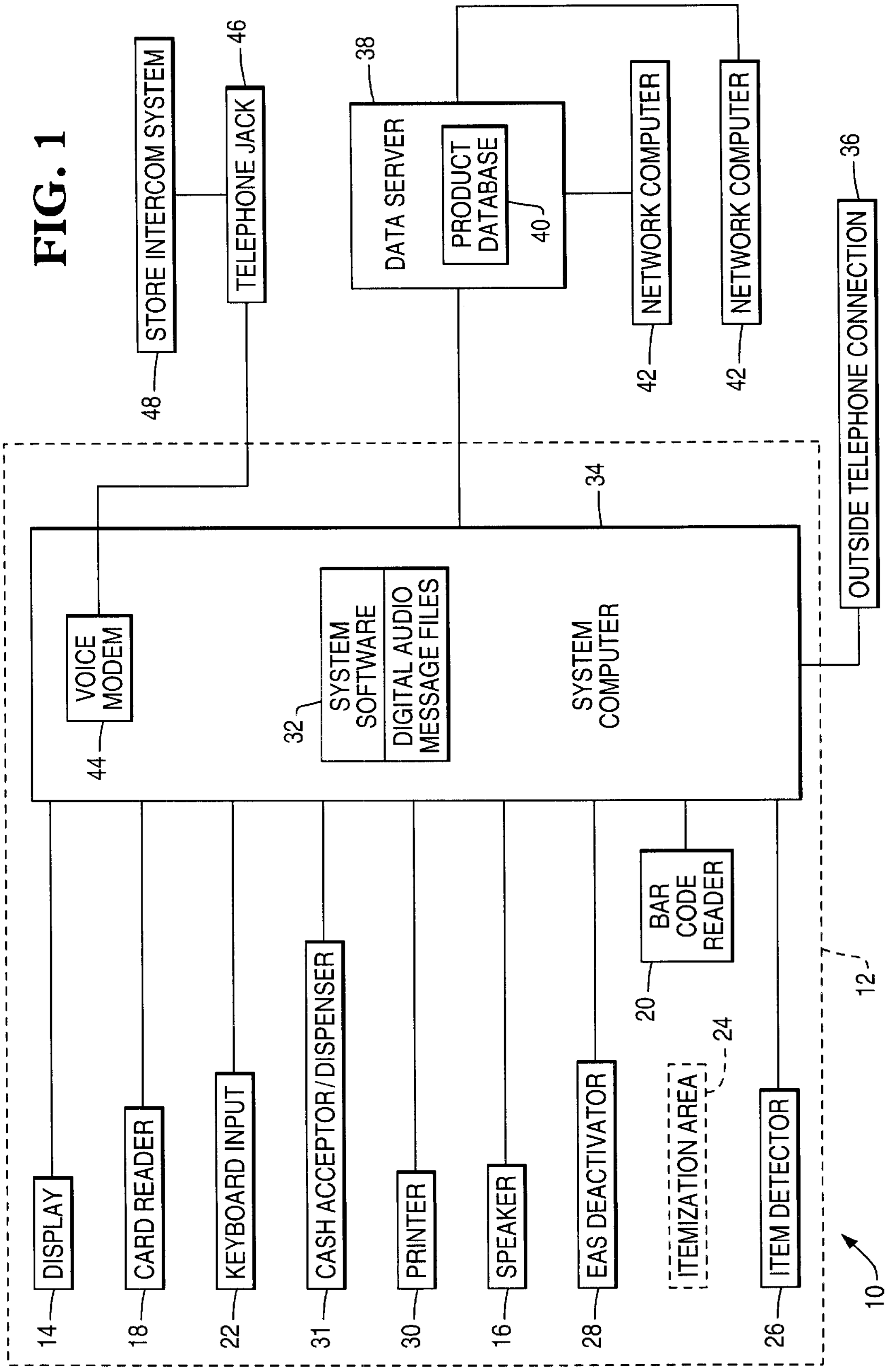
FIG. 1 shows a diagram of a self-checkout system according to the present invention.

FIG. 1 shows a diagram of a self-checkout system 10 according to the present invention. The system includes a stand-alone self-checkout terminal 12 that is located proximate to the store exit. A display 14 and speaker 16 provide instructions and other information to the customer. The customer, prompted by the display 14 and speaker 16, initiates the self checkout process by inserting a credit card or an ATM card into a card reader 18. Alternatively, the customer can begin a transaction by itemizing their first item, typically by scanning it on a bar code reader 20. Yet another way to start the transaction is by pressing a start button on a touch screen display 14 or keyboard 22. The customer then itemizes each item that they intend to purchase, following any instructions from the display 14 or the speaker 16. After each article is itemized, it is placed into the itemization area 24. The article is detected by an item detector 26. After the article passes any desired security checks, the electronic article surveillance (EAS) tag on the article is deactivated by EAS deactivator 28. When the transaction is completed, a receipt is printed out at printer 30.

The input and output devices 14–31 used in the self-checkout process are controlled by system software 32 executed by system computer 34, which monitors each stage of the self-checkout process. As shown in FIG. 1, the system computer 34 includes an outside telephone connection 36, which is used by the system to obtain credit card information, and further includes a connection to a data server 38 that has a product database 40 containing information as to the various products sold by the store, including pricing information. The data server 38 is also preferably connected to other computers 42 in a network configuration. In most stores, the data server is connected to an outside telephone line rather than each individual terminal.

As shown in FIG. 1, system 10 further includes a voice modem 44. Although shown as an internal modem, voice modem 44 can be either an external modem or an internal modem, as desired. The connection of voice modem 44 into the system computer 34 is made per the specifications of the model of modem used. The modem is then wired to a telephone jack 46 in the store, which in turn is connected to the store intercom system 48.

System computer 34 continuously monitors devices 14–30, as well as the outside telephone connection 36 and the connection to data server 38, to determine whether intervention by a store associate is required. Various exemplary reasons for summoning store personnel have been listed above. It should be borne in mind that that list is illustrative, and that other reasons for summoning store personnel will be apparent, and will differ for different transaction environments. As shown in FIG. 1, system software 32 has access to digital audio files 50, which are files containing various messages to be played over the store intercom system 48.

When the system software detects that intervention by a store associate is required, the software 32 then determines through an algorithm or lookup table which digital audio file to play for the type of intervention required. For example, when a customer purchases alcohol at a self-checkout lane, the terminal can send a digital audio file over the modem resulting in the words "RESTRICTED ITEM, HELP NEEDED ON LANE ONE" being heard over the store's intercom. If the system detects that its cash acceptor 31 is full, then it sends a message that says "CASH PICKUP ON LANE ONE." If another lane is out of paper, that terminal generates a "NEED PAPER ON LANE TWO" message. It will be appreciated that the system may be readily implemented to be capable of sending any desired message over the store intercom system.

After determining which audio file to play, the self-checkout terminal issues the appropriate commands through the voice modem to access the intercom system. For example, if the store normally dials *9 on their telephones to access the intercom, then the self-checkout terminal sends the command to dial *9 to the voice modem. Next, the self-checkout terminal sends the command to the voice modem to play the audio file.

Figure 2:
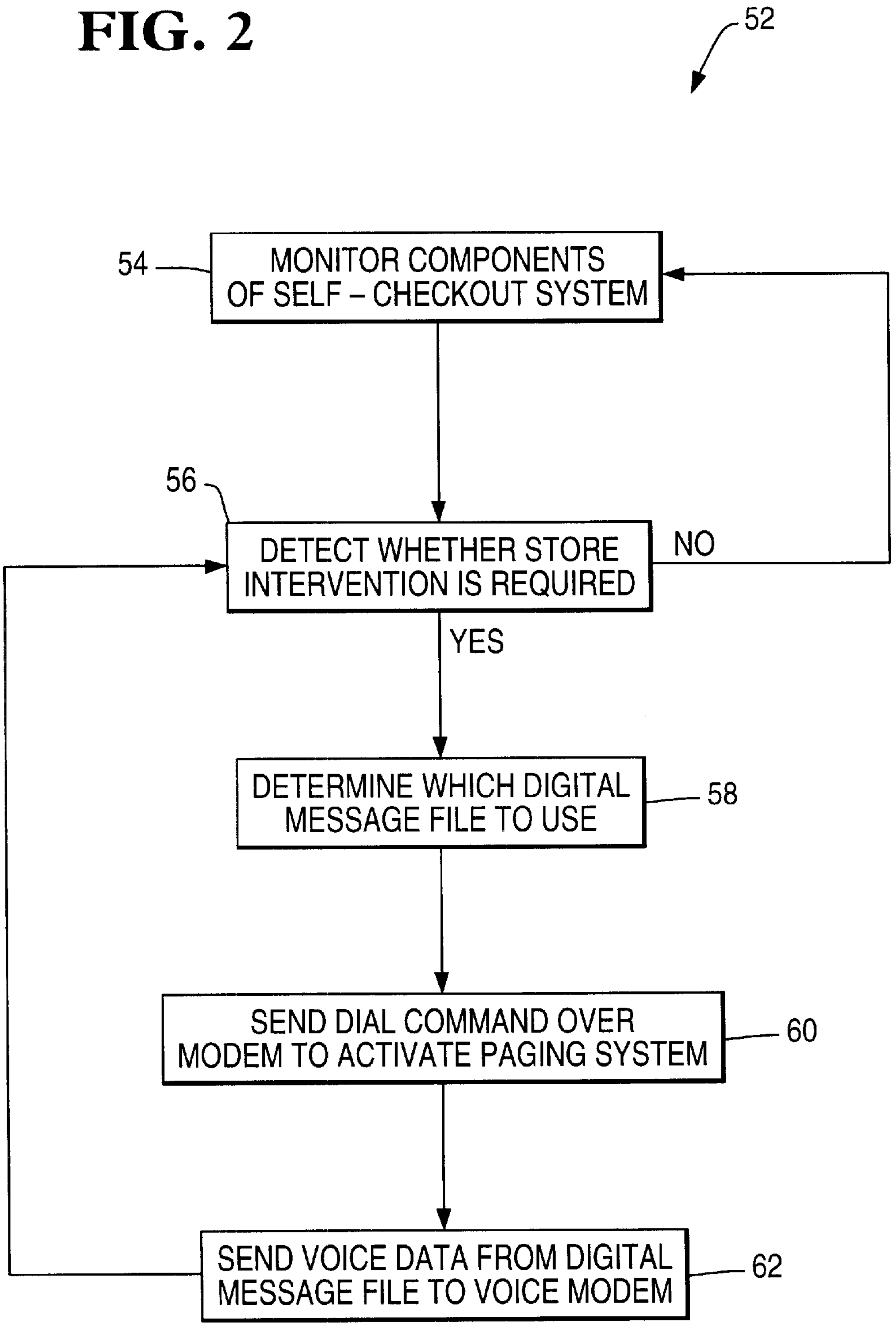
FIG. 2 shows a flowchart of a method according to the present invention.

FIG. 2 shows a flowchart of a method 52 according to the present invention. In the first step 54, the system performs a continuous monitoring of the various components of the self-checkout system. In the second step 56, the system detects whether store intervention is required. In other words, the system determines whether there exists an error condition, or other situation requiring the assistance of store personnel. If no store intervention is required, the system continues its monitoring of system components. In the third step 58, if the system determines that store intervention is required, the system determines which digital message file to use. This determination can be accomplished with a lookup table or other algorithm. In a fourth step 60, the system sends a dial command (e.g., *9) over the modem to activate the store's paging system. Finally, in step 62, the system sends the voice data from the message file to the voice modem for broadcast over the store's paging system, and steps 56–64 are repeated until the system determines that store intervention is no longer required.

While the foregoing description includes detail which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A self-checkout terminal, comprising:

input and output devices for performing a self-checkout process, the input and output devices being controlled and monitored by system software, the system software determining, based on its monitoring of the input and output devices, whether intervention by store personnel is necessary; and digital audio files accessible by the system software, the digital audio files containing announcements to be played on a store intercom system, such that when the system software determines that intervention by store personnel is necessary, it selects an appropriate digital audio file and plays it over the store intercom system.

2. A self-checkout terminal according to claim 1, wherein the system software uses a lookup table to determine which audio file to play.

3. A self-checkout terminal according to claim 1, further including a voice modem controlled by the system software for providing a digital audio signal output to the store intercom system, the system software playing the selected digital audio file over the store intercom system by means of the voice modem.

4. A self-checkout terminal according to claim 3, wherein the voice modem is coupled to the store intercom system by means of a telephone jack in a private telephone network.

5. A self-checkout terminal according to claim 4, wherein the system software issues a command to the voice modem to establish a connection to the store intercom system prior to playing the digital audio file.

6. A method for notifying store associates when assistance is required at a self-checkout terminal, the method comprising:

providing digital audio files containing messages to be played over the store intercom system;

monitoring the self-checkout terminal's input and output devices;

determining whether store intervention is required;

selecting an appropriate digital audio file if store intervention is required;

playing the digital audio file over the store intercom system.

7. A method according to claim 6, wherein the step of selection an appropriate digital audio file including using a lookup table.

8. A method according to claim 6, further including the step of providing a voice modem connected between the self-checkout terminal and the store intercom system, and wherein the step of playing the digital audio file over the store intercom system includes playing the digital audio file over the store intercom system by means of the voice modem.

9. A method according to claim 8, wherein the step of providing a voice modem connected between the self-checkout terminal and the store intercom system includes coupling the self-checkout terminal to the store intercom system by means of a telephone jack in a private telephone network.

10. A method according to claim 9, including the further step of issuing a command to the voice modem to establish a connection to the store intercom system prior to the step of playing the digital audio file over the store intercom system.

11. A system for requesting assistance at a self-checkout terminal, comprising:

a system computer;

input and output devices used in a self-checkout process, the input and output devices controlled by system software executed by the system computer, the system software having access to audio files containing messages to be played over a store paging system;

a voice modem connected to the system computer, the voice modem wired to a telephone jack connected to the store paging system, the system computer continuously monitoring the input and output devices and, when it is detected that intervention by a store associate is required, determining which audio file to play for the required intervention, issuing commands through the voice modem to access the store paging system, and sending a command to the voice modem to play the audio file.

12. The system of claim 11, wherein in accessing the store paging system, the system computer sends a dial command over the modem to activate the store's paging system.

13. The system of claim 12, wherein in accessing the store paging system, the system computer sends the command to dial *9 to activate the store's paging system.

* * * * *